US010235191B2

United States Patent
Rao et al.

(10) Patent No.: US 10,235,191 B2
(45) Date of Patent: Mar. 19, 2019

(54) APPLICATION SPECIFIC CONFIGURABLE GRAPHICAL USER INTERFACE

(71) Applicant: SAP SE, Walldorf (DE)

(72) Inventors: Ashok Rao, Tiptur (IN); Avinash Gopala Reddy, Bangalore (IN); Arun Mathew, Bangalore (IN); Sharath Prakash, Bangalore (IN); Anjana Satheesh P K, Ernakulam (IN); Shalini Krishnamoorthy, Bangalore (IN); Sona Dalsania, Bangalore (IN); Prarthana Henly Onkar, Bangalore (IN); Mohammed Ziyauddin, Bangalore (IN)

(73) Assignee: SAP SE, Walldorf (DE)

( * ) Notice: Subject to any disclaimer, the term of this patent is extended or adjusted under 35 U.S.C. 154(b) by 584 days.

(21) Appl. No.: 14/967,358

(22) Filed: Dec. 14, 2015

(65) Prior Publication Data
US 2017/0168854 A1 Jun. 15, 2017

(51) Int. Cl.
*G06F 9/451* (2018.01)
*G06F 8/30* (2018.01)
*G06F 8/34* (2018.01)

(52) U.S. Cl.
CPC .............. *G06F 9/451* (2018.02); *G06F 8/315* (2013.01); *G06F 8/34* (2013.01)

(58) Field of Classification Search
CPC .......................... G06F 17/30312; G06F 9/451
See application file for complete search history.

(56) References Cited

U.S. PATENT DOCUMENTS

| 2006/0235871 | A1* | 10/2006 | Trainor ............ G06F 17/30722 |
| 2009/0320007 | A1* | 12/2009 | Krishnaswamy ... G06F 9/44521 717/151 |
| 2011/0154253 | A1* | 6/2011 | Lehr ...................... G06Q 10/10 715/810 |
| 2011/0246401 | A1* | 10/2011 | Arora ................ G06F 17/30572 706/12 |
| 2013/0174181 | A1* | 7/2013 | Jentsch ...................... G06F 9/54 719/328 |
| 2014/0047412 | A1* | 2/2014 | Schlarb .................. G06Q 10/06 717/106 |
| 2016/0239272 | A1* | 8/2016 | Petri .......................... G06F 8/35 |
| 2016/0371062 | A1* | 12/2016 | Wood ........................ G06F 8/35 |

* cited by examiner

*Primary Examiner* — Omar R Abdul-Ali
(74) *Attorney, Agent, or Firm* — Buckley, Maschoff & Talwalkar LLC (57) ABSTRACT

Methods and system are disclosed that manage behavior of a graphical user interface associated with an application during a runtime of the application. In one aspect, the graphical user interface (GUI) may be configured with attributes associated with the application by a GUI configuration manager. Upon determining application configuration information, a data field metadata manager may determine data fields to be mapped onto the GUI. The data field metadata manager may read the metadata information associated with the data fields that may include data field attributes and domain values. A GUI metadata manager may retrieve metadata information associated with the mapped data fields. A GUI runtime manager may manage the behavior of the GUI and the data received by the data fields may be saved in a data store in a data format associated with the application.

18 Claims, 6 Drawing Sheets

APPLICATION SPECIFIC CONFIGURABLE GRAPHICAL USER INTERFACE

BACKGROUND

Enterprises may have various software applications deployed for executing and managing specific tasks. An end user may interact with such software applications using an interface. Typically, such interfaces may have generic elements, may be independent of the application configuration and runtime behavior of the interfaces may not be manageable. Therefore, designing an application specific interface such that the runtime behavior of the interface is manageable may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques related to application specific configurable graphical user interface are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A graphical user interface (GUI) may correspond to an interface that may provide a platform to interact with an application. GUIs may typically include graphical layout, graphical elements, control elements, etc., that may be configured or designed during a design time of the application. The behavior of graphical elements, control elements, etc., may be managed or controlled at the application runtime by using attributes associated with the application. In this document, the terms GUI, user interface (UI), form, etc., may be used interchangeably to describe different embodiments.

In an embodiment, a software component may correspond to a set of instructions or program code that may be reused based on definition and implementation. Based on executed operations, the cooperation between the software components may facilitate instantiation of models, user interface engines, managing behavior of the GUIs at the design time and runtime, etc., and may improve user experience in developing software applications, user interface modeling and data modeling.

Figure 1:
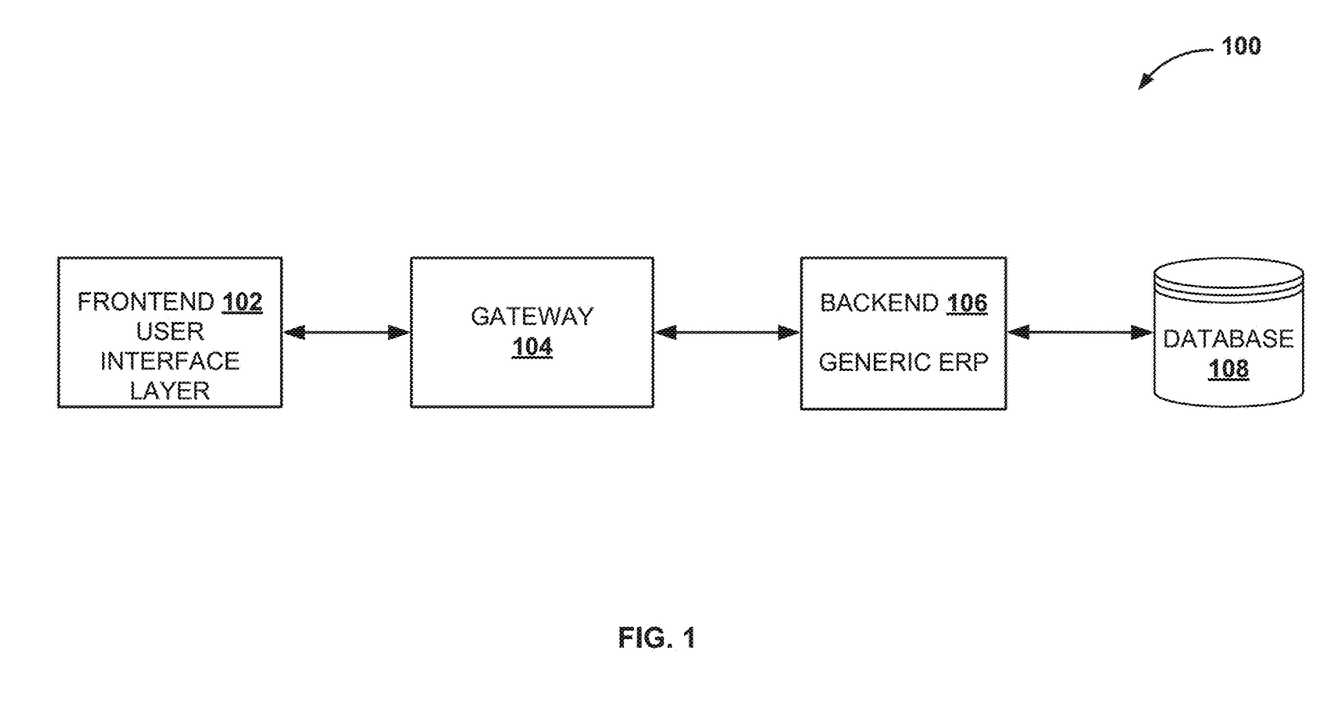
FIG. 1 is a block diagram illustrating an environment to manage behavior of a graphical user interface, according to an embodiment.

FIG. 1 is a block diagram illustrating an environment 100 to manage behavior of a graphical user interface, according to an embodiment. Environment 100 may include frontend 102, gateway 104 and backend 106. The frontend 102, gateway 104 and backend 106 may be in communication with one another over a network (not shown). In an embodiment, frontend 102 may include a user interface (UI) layer that may consume services from gateway 104 and backend 106. During an application design time, UI layer may facilitate designing application specific GUIs. The UI layer may include an integration of software components such as UI designer, UI runtime, etc., that may work in conjunction with each other. The UI designer software component may consume services from software components deployed in the gateway and the backend. The UI designer software component may facilitate designing layout, configuring application specific attributes, etc., during the application design. The UI runtime software component may facilitate managing the behavior of UI during the application runtime. In an embodiment, gateway 104 may include integration software of components that may work in conjunction with each other. The software components integrated in gateway 104 may provide services that may be consumed by frontend 102 and backend 106 during the application design time and runtime.

In an embodiment, backend 106 may include a generic enterprise resource planning (ERP) application or generic ERP system that may be in communication with database 108 (e.g., multiple data stores). The generic ERP application may include an integration of software components that may work in conjunction with each other. The generic ERP system may consume services from gateway 104 and may be also in communication with the UI layer via gateway 104. In an embodiment, data stores (e.g., 108) may store data related to application configuration, metadata associated with the GUIs of the application, application configuration information, GUI design time and runtime data, etc. The frontend, gateway and backend may facilitate designing application specific GUIs and managing the behavior of the GUIs during the application runtime.

Figure 2:
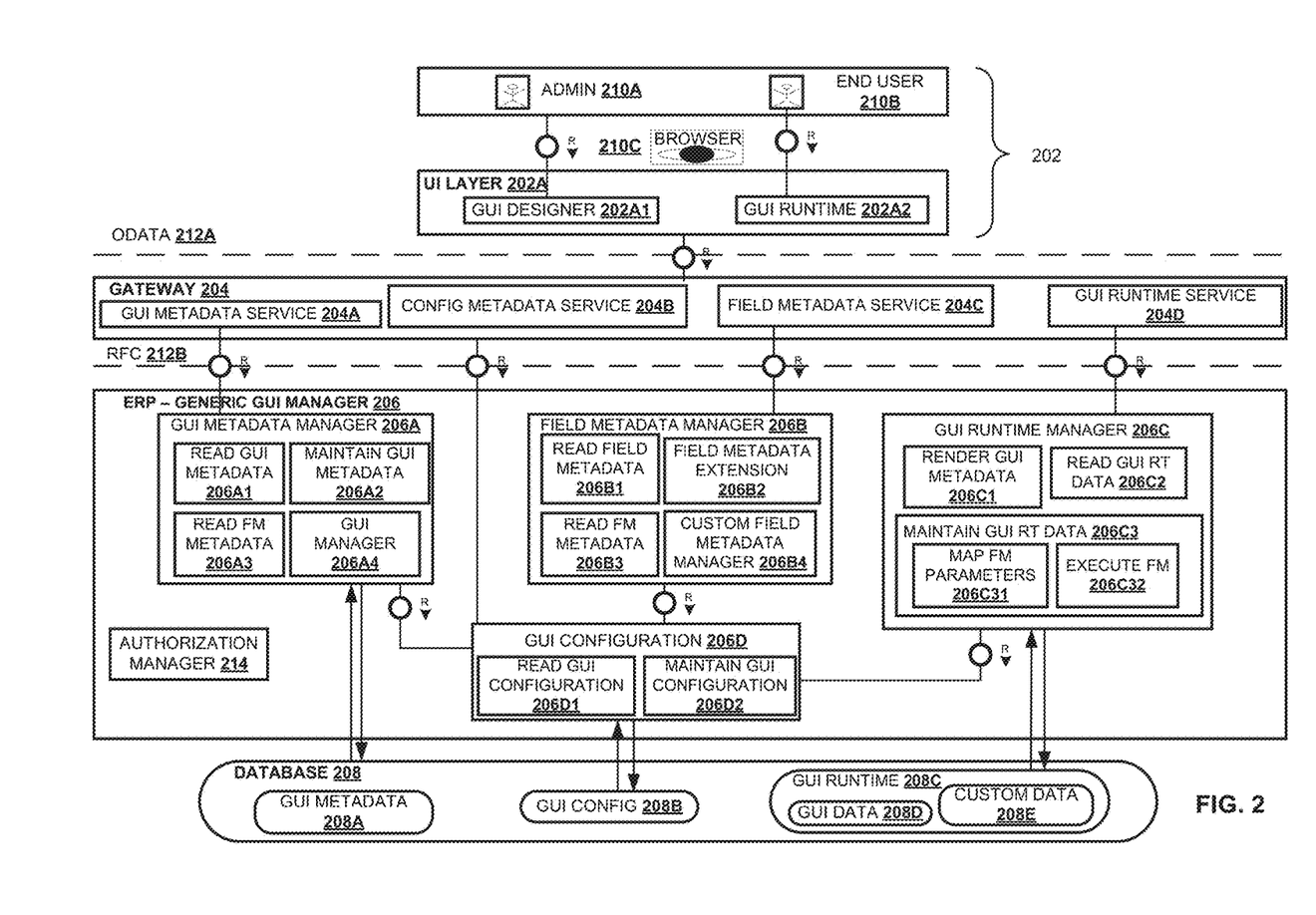
FIG. 2 is a block diagram illustrating a system to manage the behavior of a graphical user interface, according to an embodiment.

FIG. 2 is a block diagram illustrating a system to manage the behavior of a graphical user interface, according to an embodiment. In an embodiment, system may include subsystems such as, frontend 202, gateway 204, backend (e.g., ERP generic GUI manager 206, database 208), etc., that may be integrated to work in cooperation with each other. In an embodiment, frontend 202 may communicate with backend (e.g., 206, 208) via gateway 204. The frontend 202, gateway 204, and backend (e.g., 206, 208) may communicate with each other by known communication protocols (e.g., Open data protocol (ODATA) 212A, JavaScript Object Notion (JSON) (not shown). Remote Function Call (RFC) 212B, etc.).

In an embodiment, frontend 202 may include a user interface (UI) layer 202A that may include an integration of software components such, as UI designer software component (e.g., GUI Designer 202A1). UI runtime software component (e.g., GUI runtime 202A2), etc. The UI designer software component (e.g., GUI Designer 202A1) may facilitate various operations including UI administration by consuming services offered by software components (e.g., 204A, 204B, 204C, 204D) deployed in gateway 204. The gateway 204 may provide services that may be consumed by a generic UI manager (also referred to as generic UI designer) (e.g., 206) for designing graphical user interface. The generic UI manager (e.g., 206) may also execute application specific operations, such as determining and validating data fields associated with the application. For example, when the data fields are associated with a specific application, the generic UI manager (e.g., 206) may validate the association of the data fields based on application configuration. During the application runtime, application specific data fields may be accessed, retrieved and rendered on the GUI. In an embodiment, an administrator 210A or an end user 210B may interact with the UI layer 202A via a browser 210C.

In an embodiment, UI designer software component (e.g., 202A1) may consume the services offered by gateway 204. For example, gateway 204 may offer services such as, configuration metadata services (e.g., config metadata service 204B), field metadata services (e.g., 204C), UI metadata services (e.g., 204), UI runtime service (e.g., 204D), etc. The services may be consumed for designing the GUI and managing administration and behavior of the GUI. In an embodiment, services provided by the above software components (e.g., 204A, 204B, 204C, and 204D) may include reading configuration information associated with the application, designing layout for GUIs, reading and retrieving metadata information, etc. In an embodiment, UI runtime software component (e.g., 202A2) may facilitate rendering GUI runtime data. The UI runtime software component (e.g., 202A2) may consume the services offered by gateway 204 when an end user enters or inputs values in the data field. For example, UI runtime service software component 204D may facilitate retaining the values entered by the user during the application runtime. The UI runtime software component (e.g., 202A2) may consume services offered from software components such as configuration metadata services (e.g., 204B), UI metadata services (e.g., 204A) and UI runtime services (e.g., 204D), field metadata service (e.g., 204C) to render the runtime GUI data, receive and persist the received user inputs from different data fields. Based on mapping information associated with the data fields (e.g., backend dependent data fields, backend independent data fields, etc.), the values in the data fields may be transferred and stored in the data store at the backend.

In an embodiment, designing and configuring the GUIs may include designing layouts, configuring application specific data fields, application specific attributes, GUI control elements, etc. The GUI may be designed based on application specific configuration information. For example, application specific settings may be configured during the design time of the GUI. Such settings may manage the behavior of the GUI during the runtime of the application. In an embodiment, UI runtime software component (e.g., 202A2) may manage the behavior of the GUI. For example, managing the runtime behavior of the GUI may include reading application specific configuration information, determining data fields to be mapped to the GUI, reading and retrieving metadata information associated with the application, based on the mapping information transferring and storing the data received in the data fields on the GUI in database, etc.

In an embodiment, gateway 204 may also facilitate communication between frontend 202 and backend (206, 208) and include an integration of software components such as, UI metadata service (e.g., 204A), configuration metadata service (e.g., 204B), field metadata service (e.g., 204C), UI runtime services (e.g., 204D). In an embodiment, configuration metadata service software component (e.g., 204B) may facilitate configuring generic UI manager (e.g., 206) for designing application specific GUIs. For example, the services provided may include determining application specific configuration based on application configuration information (e.g., application context identifiers). The application configuration information may facilitate displaying the GUI features and services associated the application. The configuration metadata service software component (204B) may work in conjunction with UI configuration manager software component (e.g., GUI configuration 206D) at the backend (e.g., 206) to provide the services associated with the application.

In an embodiment, based on the configuration information associated with the application, field metadata service software component (e.g., 204C) may facilitate mapping the data fields associated with the application. The field metadata may include attributes such as Field Name, Domain Information, Data types of fields, etc. The field metadata services software component (e.g., 204C) may work in conjunction with the field metadata manager (e.g., GUI metadata manager 206A) in backend (e.g., 206) to provide the services associated with the application. In an embodiment, UI metadata services software component (e.g., 204A) may provide services to the GUI. For example, such services may include reading UI metadata, maintaining UI metadata, etc. The UI runtime services software component (e.g., 204D) may provide services for UI runtime management. For example, such services may include reading GUI runtime data, maintaining GUI runtime data, etc. The GUI runtime services software component (e.g., 204D) may work in conjunction with the GUI metadata manager (e.g., 206A) at backend (e.g., 206) to provide services associated with the application.

In an embodiment, backend may include a generic UI manager (e.g., an enterprise resource planning (ERP) system, generic UI designer, etc., 206) in communication with multiple data stores (e.g., database 208). The data stores (e.g., 208) may store data in data structures (e.g., flat files, tables, etc.). The data stored in the data stores may correspond to UI metadata (e.g., 208A). UI configuration data (e.g., 208B), UI runtime data 208C (e.g., data received via the GUI from an end user 208D, user defined data (or custom data 208E), etc.), etc. The UI metadata 208A may correspond to metadata associated with the GUI design. Such metadata may be persisted in a persistency layer associated with the GUI (or alternately in a persistency layer of database 208). The UI metadata 208A may be stored and referenced by application context identifiers.

In an embodiment, UI configuration data 208B may correspond to application specific configuration information and data that may be used to design the GUI. Such information and data may be used to manage the behavior of the GUI during the runtime of the application. A persistency layer associated with the UI runtime data 208C may store the UI runtime data (e.g., 208C, 208D, 208E) and backend independent data fields. The UI runtime data 208C may be referenced by application context identifier, an UI identifier, etc., and stored in the database.

In an embodiment, generic UI manager 206 may include an integration of software components (e.g., 206A, 206B, 206C, 206D, and 214) that may facilitate designing application specific GUIs and managing the behavior of the GUIs during the runtime of the application. For example, the generic UI manager 206 may include software components such as UI configuration manager (e.g., 206D), field metadata manager (e.g., 206B), UI metadata manager (e.g., 206A), UI runtime manager (e.g., 206C), authorization manager (e.g., 214), etc.

In an embodiment, during an application design time, UI configuration manager (e.g., 206D) may facilitate designing application specific GUIs. For instance, the GUI may be configured with application specific attributes, data fields, GUI elements (e.g., drop down menu, radio button, etc.), etc. The UI configuration manager software component (e.g., 206D) may be used to configure the GUI with application specific attributes, such as context identifiers (e.g., application context identifiers), name, GUI identifiers, application specific functionalities (e.g., create, update, delete, read, non-persistent metadata, persistent metadata, etc.), application specific GUI submission identifiers (e.g., type, data field), custom data (e.g., data type), persistency information of data (e.g., persistent, non-persistent, etc.), etc.

In an embodiment. UI configuration manager software component 206D may facilitate configuring specific settings for the application. The UI configuration manager software component 206 D may work in conjunction with associated software components such as, a UI configuration maintenance software component (e.g., 206D2—maintain GUI configuration) and UI read configuration software component (e.g., 206D 1). The UI configuration maintenance software component (e.g., 206D2) may maintain (e.g., retain, store, etc.) information associated with UI configuration, application specific configuration, etc. The read UI configuration software component (e.g., 206D1) may facilitate reading the application specific configuration information during the runtime of the application.

In an embodiment, field metadata manager (e.g., 206B) may determine data fields to be mapped on the GUI. The data field metadata manager 206B may use the application specific configuration information, read metadata information associated with the data fields, and map the data fields on the GUI. For example, the metadata information may include data field attributes, domain values, and other associated metadata. The metadata information may be filtered using business add-ins (BADI). The BADI may be configured to extract application specific configuration information and filter the associated metadata information therein.

In an embodiment, field metadata manager 206B may work in conjunction with other associated software component, such as, read field metadata 206B1, field metadata (FM) extension 206B2, read FM metadata 206B3, custom field metadata manager 206B4, etc. The read field metadata software component 206B1 may facilitate transferring field metadata (FM) associated with the application. The read field metadata software component 206B1 may be configured to work in conjunction with the read FM metadata software component 206B3 to read the metadata fields associated with the application. Upon reading the metadata fields, the FM extension software component 206B2 may be triggered or instantiated to extract the field metadata using the BADI associated with the application. The FM may be determined or identified by attributes, such as Field Name, Field Domain, Data type, value, etc.

In an embodiment, the UI field metadata may be extracted by read FM metadata software component 206B3. The field metadata to be extracted may be filtered using BADI associated with the application. In an embodiment, during the runtime of the application, the data fields may not be extended and mapped as values associated with the data fields may not be mapped. In such a scenario, the custom field metadata manager software component 206B4 may map and extract data or metadata information from data structures (e.g., tables) instead of the field metadata.

In an embodiment, UI metadata manager 206A may facilitate storing the metadata information associated with the GUI during the design time of the application. Such metadata information may include configuration information associated with the GUI as designed during the design time by an end user or an administrator. The UI metadata manager software component 206A may facilitate storing information related to GUI layout, backend data field mapping, etc.

In an embodiment, UI metadata manager software component 206A may facilitate managing and storing data in the backend integrated data fields and backend independent data fields. The backend integrated data fields may store field metadata configured or associated with the application. The values in the backend integrated data fields may be mapped to the application FM fields during the runtime of the application. The data field identifiers may be used to determine the FM. In an embodiment, backend independent data fields may not be mapped at the backend. During the runtime of the application, the values in the backend independent data fields may persist the data in the data fields and store such data in database (e.g., GUI designer database table). The backend independent data fields may be associated with unique data field identifiers that may be automatically generated during the design time (e.g., by UI configuration manager) or the application.

In an embodiment, UI metadata manager 206A may be associated with other software components such as, read UI metadata software component 206A 1, maintain UI metadata component 206A2, read FM metadata 206A3, UI manager 206A4, etc. In an embodiment, read UI metadata software component 206A1 may facilitate reading metadata information during runtime of the application. For example, the data received by user input during the application runtime may be associated with metadata information. The metadata information may be read using application context identifiers, UI identifiers. When multiple GUIs are designed for an application, the application context identifiers may be used to search the GUIs.

In an embodiment, maintain UI metadata software component 206A2 may facilitate operations such as create, update, delete, etc. associated with the UI metadata. In an embodiment, read FM metadata software component 206A3 may facilitate validating the metadata information associated with the GUI during the application runtime. Such an operation may validate the consistency of metadata information associated the GUIs. For example, consistency in metadata information during the GUI or application design time and application runtime may be validated. In an embodiment, UI manager software component 206A4 may facilitate managing operations associated with the software components, such as, read UI metadata 206A1, maintain UI metadata 206A2, read FM metadata 206A3, etc. The UI manager software component 206A4 may facilitate execution of operations like BADI exits for application, generating GUI identifiers, etc.

In an embodiment, UI runtime manager software component 206C may facilitate receiving data from the GUI during the application runtime, transfer the data to the backend and save data in the database in a user-defined format. Such data may also be referred to as GUI runtime data (e.g., 208C) and may include data associated with backend integrated data fields, backend independent data fields, GUI administration data, etc. (e.g., 208D, 208E). In an embodiment, the data received by the data fields in the GUI during the runtime of the application may be transferred as a block "content." The data from the data fields from the GUI may be transferred as key-value pairs (e.g., backend data field identifier—UI value pair) and stored in database in the user-defined format (e.g., data format associated with the application).

In an embodiment, the data corresponding to the backend independent data fields may be transferred to the backend as "Custom Content." The data from the data fields in the GUI may be transferred as key-value pairs (e.g., backend data field identifier—UI value pair). Based on the application specific configuration, the data associated with the backend independent GUI fields may be persisted at the application or at the generic UI designer system.

In an embodiment, UI runtime manager software component 206C may work in conjunction with other software components, such as render UI metadata 206C1, read runtime data (e.g., read GUI RT data 206C2), maintain runtime data (e.g., maintain GUI RT data 206C3), etc. The render UI metadata software component 206C1 may work in conjunction with the UI metadata manager 206A to read the metadata information from the GUI using application specific GUI identifiers. In an embodiment, the read UI runtime data software component 206C2 may facilitate retrieving the UI runtime data fields and render the runtime data on the GUI. The data associated with the "content" block may be retrieved by instantiating or triggering the corresponding read FM software component configured for the application. The data corresponding to the "custom content" may be retrieved using the data persisted in the generic GUI designer or using BADI exit associated with application. The GUI admin data is retrieved using BADI exit for applications. The UI runtime identifier specific to the application may be used to retrieve GUI runtime data.

In an embodiment, maintain UI runtime data software component 206C3 may facilitate executing operations such as, creating, updating, deleting, generation of UI runtime identifiers, etc., to manage the runtime UI data. Based on the application configuration information, the UI runtime identifiers may be generated using the application BADI exits. A map FM parameters software component 206C31 may facilitate the mapping of UI runtime data (e.g., Form field key—Value) into application specific FM parameters. An execute FM software component 206C32 may facilitate executing the application specific FM and are based on results of FM execution. In an embodiment, the custom content (e.g., 208E, custom data) is persisted in the generic UI manager (e.g., ERP system) or Application BADI exits. The UI administration data may be transferred to application BADI exit that may persist the GUI administration data in the required format for the application.

In an embodiment, authorization manager software component 214 may facilitate authorizing an end user. For example, based on authorization information associated with the end user, appropriate content or data may be retrieved from the database and displayed on the GUI. Application specific authorization may be configured that may be executed using BADI exits associated with the application.

Figure 3:
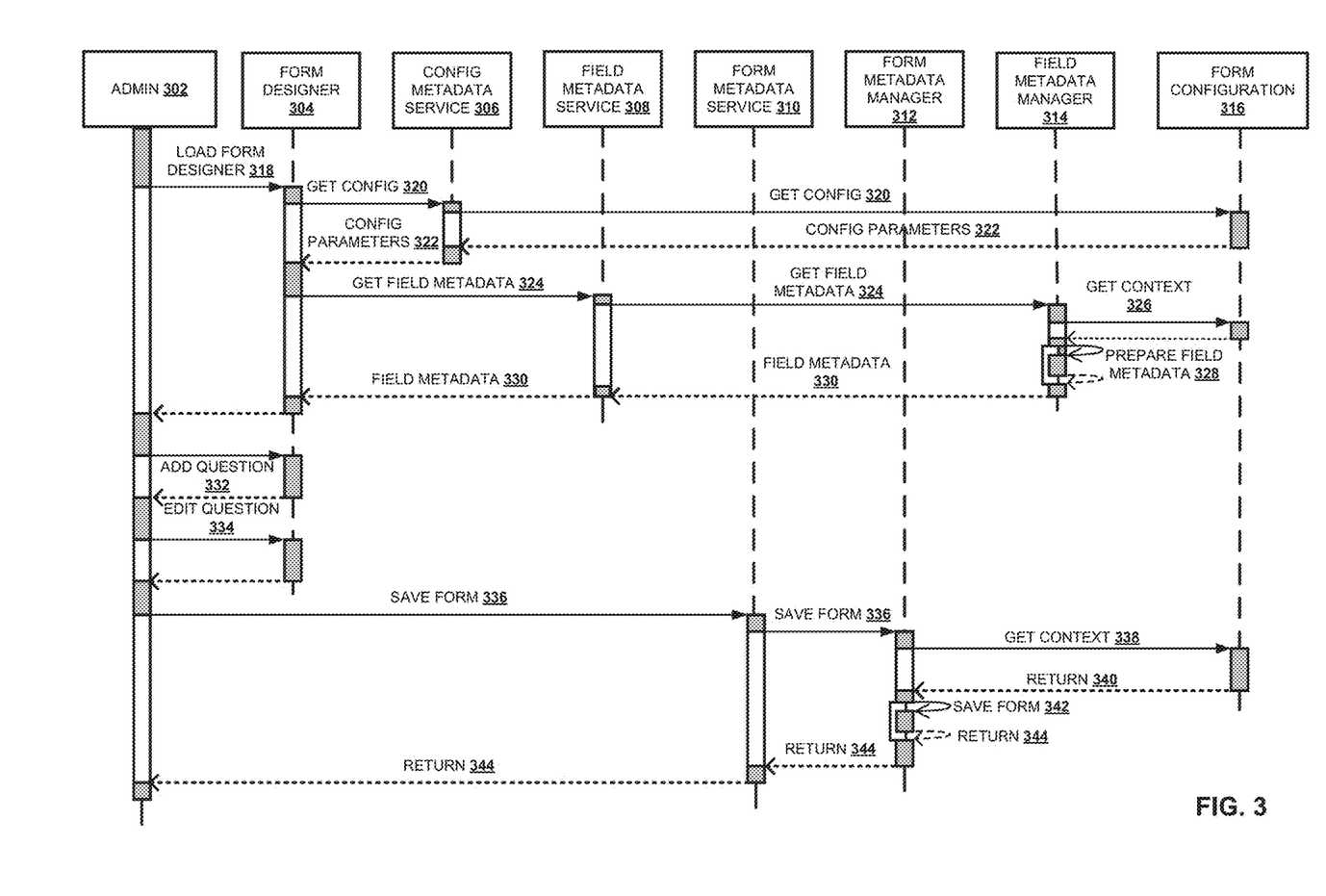
FIG. 3 is a sequence diagram illustrating communication between software components to manage behavior of a graphical user interface at a design time, according to an embodiment.

FIG. 3 is a sequence diagram illustrating communication between software components to manage behavior of a graphical user interface at a design time, according to an embodiment. In an embodiment, an admin 302 (e.g., end user) may use the front end (e.g., UI layer) to design the GUI. In an embodiment, admin 302 may use generic form designer 304 (also referred to as generic form manager) to design the form. For example, specific actions or events may be triggered between software components working in conjunction between frontend, gateway and backend (e.g., form designer 304, configuration metadata service 306, field metadata service 308, form metadata service 310, form metadata manager 312, field metadata manager 314, form configuration 316, etc.).

In an embodiment, admin 302 may begin designing the GUI by instantiating an action of load the form design 318. The form designer component 304 may instantiate the action or event (e.g., get config 320) to request for application configuration information from configuration metadata service component 306. The configuration metadata service component 306 may instantiate the action or event (e.g., get config 320) to fetch the application configuration information from form configuration component 316. The form configuration component 316 may process the request and respond by sending application configuration parameters 322 to config metadata service component 306. The configuration parameters 322 may further be processed and sent to form designer component 304.

In an embodiment, subsequently form designer component 304 may instantiate the action or event to request (e.g., get field metadata 324) for field metadata from field metadata service component 308. The field metadata service component 308 may process the request and forward the request (e.g., get field metadata 324) to field metadata manager component 314. The field metadata manager may request (e.g., get context 326) for contextual data from the form configuration component 316. In response, form configuration component 316 may send the requested contextual data to the field metadata manager 314. Upon receiving the contextual data from form configuration component 316, field metadata manager 314 may prepare field metadata 328 and send the field metadata 330 to field metadata service component 308. The field metadata 330 may be received by form designer component 304, processed and subsequently sent to admin 302.

In an embodiment, admin 302 may trigger additional actions or events (e.g., adding questions 332, editing the questions 334, etc.), to the form that may be processed by form designer component 304. In an embodiment, upon designing the form, admin 302 may execute the action of saving the form. When the action of saving the form is instantiated or triggered, the request (e.g., save form 336) may be forward to form metadata service component 310 and subsequently to form metadata manager 312. Upon processing the request to save the form, form metadata manager 312 may trigger an action to request for context information (e.g., get context 338) to form configuration component 316. The form configuration component 316 may process the request by returning 340 the requested content. Upon receiving the content, form metadata manager component 312 may save the form 342 and return an acknowledgement (e.g., return 344) to admin 302 by consuming the services from form metadata service component 310.

Figure 4:
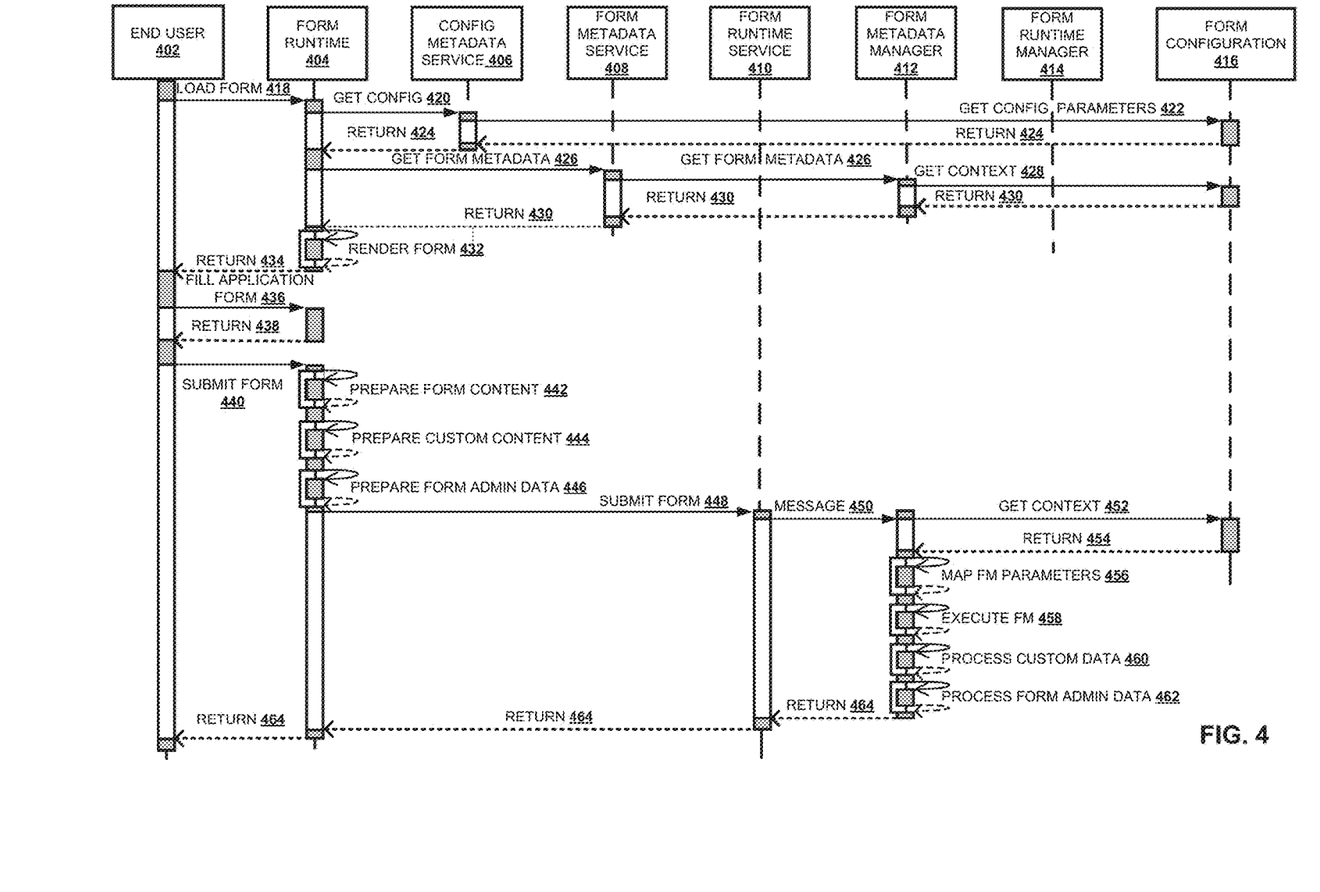
FIG. 4 is a sequence diagram illustrating communication between software components to manage behavior of a graphical user interface at a runtime, according to an embodiment.

FIG. 4 is a sequence diagram illustrating communication between software components to manage behavior of a graphical user interface at a runtime, according to an embodiment. In an embodiment, during an application runtime, a sequence of actions or events may be periodically triggered. During the application runtime, form runtime software component 404 may instantiate or trigger an action from end user 402. Upon processing the request (e.g., load form 418), form runtime component 404 may request (e.g., get config 420) for application configuration information from configuration metadata service component 406. Subsequently, configuration metadata service component 406 may process the request and forward request (e.g., get config parameters 422) to fetch configuration parameters from form configuration component 416. The form configuration component 416 may process the request and return 424 the request configuration parameters to the configuration metadata service component 406. The configuration parameters may be subsequently sent (e.g., return 424) to form runtime component 404.

In an embodiment, upon receiving the configuration parameters, form runtime component 404 may request (e.g., get form metadata 426) for form metadata from form metadata service component 408. The form metadata service component 408 may process the request (e.g., get form metadata 426) by forwarding the request (e.g., get form metadata 426) to form metadata manager component 412. The form metadata manager component 412 may process the request and forward the request (e.g., get context 428) to fetch the contextual information from the form configuration component 416. The form configuration component 416 may process the request and return 430 the requested contextual information (e.g., application specific configuration information, context identifiers, etc.) to form runtime component 404 via form metadata manager 412 and form metadata service 408. Upon processing the received contextual information, form runtime component 404 may render 432 the form (e.g., return 434) to end user 402.

In an embodiment, end user 402 may execute an action to fill the form 436 (e.g., fill the rendered form with the requested data in the respective data fields) that may be received, processed and returned 438 by form runtime component. Upon filling the form, the end user 402 may submit 440 the form. Upon submitting the form, form runtime component 404 may process the data received from end user 402. For example, processing the data from end user 402 may include processing to segregate data and prepare form data (e.g., prepare form content 442, prepare custom content 444, prepare form administration data 446, etc.) by executing actions. Upon processing and segregating data, form runtime component 404 may execute the action of "submit form" 448 that may be forwarded to form runtime service component 410. The form runtime service component 410 may process the submitted form and forward a request (e.g., message 450) to form runtime manager 414. The form metadata manager component 412 may request (e.g., get context 452) for contextual information from form configuration component 416. The form configuration component 416 may process the request and return 454 the requested contextual information.

In an embodiment, upon receiving the requested contextual information, the form metadata manager may execute actions such as, map FM parameters 456, execute FM 458, process custom data 460, process form administration data 462, etc. The process of submitting the form may be completed when the end user receives an acknowledgement (e.g., return 464) that may be triggered by from form metadata manager component 412 via the form runtime service component 410 and the form runtime component 404.

Figure 5:
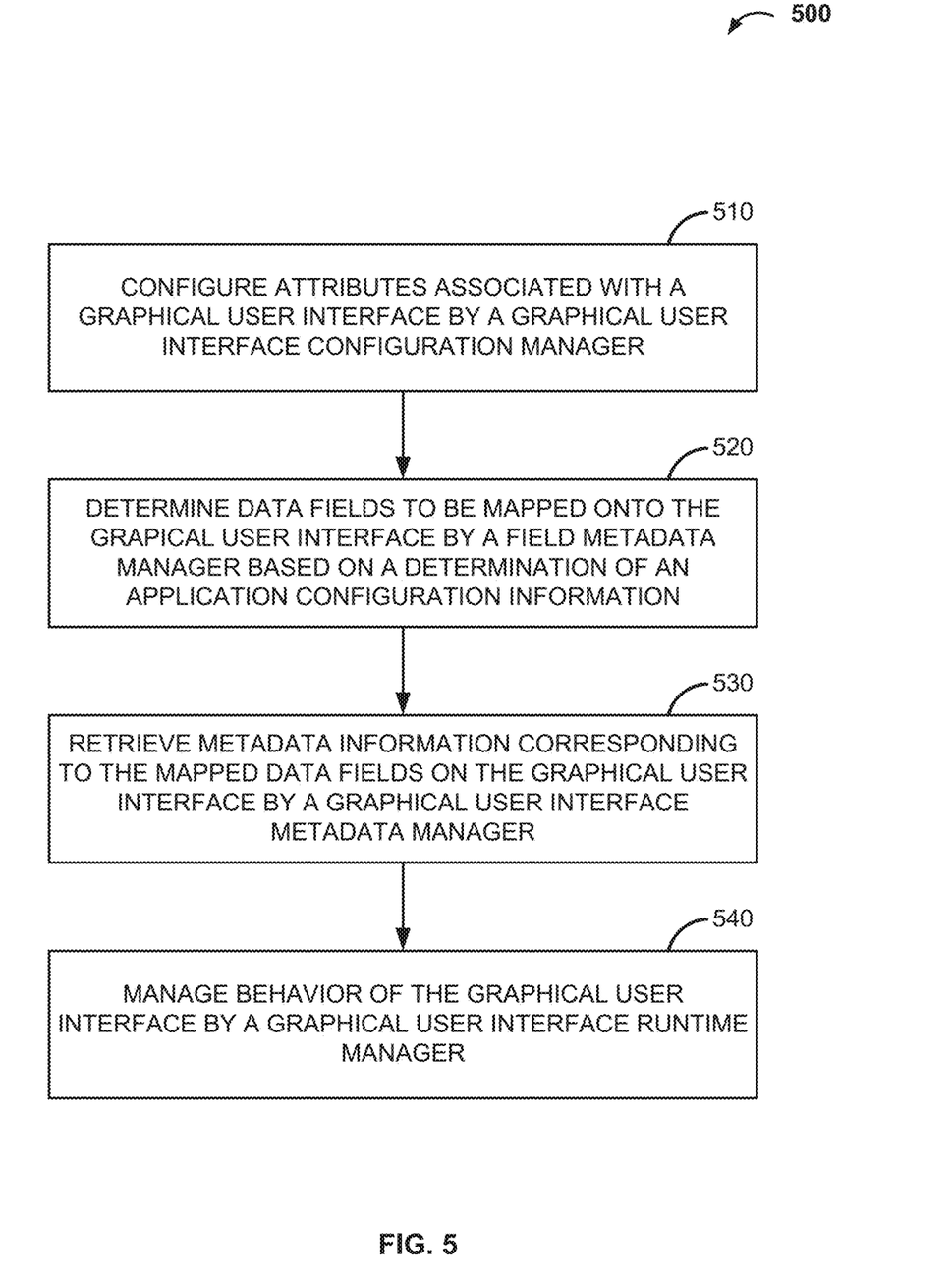
FIG. 5 is a block diagram illustration a process to manage behavior of a graphical user interface, according to an embodiment.

FIG. 5 is a block diagram illustration a process 500 to manage behavior of a graphical user interface, according to an embodiment. In an embodiment, a graphical user interface configuration manager configures attributes associated with a graphical user interface, at 510. The attributes may be associated and correspond to application configuration information or configuration data. The attributes may provide managing behavior of the GUI during the application runtime. Based on a determination of application configuration information, a field metadata manager determines data fields to be mapped onto the graphical user interface, at 520. The field metadata manager may read metadata information associated with the data fields. The metadata information may include data field attributes, domain values, etc.

In an embodiment, a graphical user interface metadata manager retrieves the metadata information corresponding to the mapped data fields on the graphical user interface, at 530. Such metadata information may correspond to the graphical user interface layout information. During the application runtime, the graphical user interface designed during the design time may be rendered. A graphical user interface runtime manager manages the behavior of the graphical user interface, at 540. The graphical user interface runtime manager may manage the behavior of the graphical user interface during the runtime in response to receiving data in the data fields during the application runtime. The received data may be stored in the data format associated with the application in a data store.

Some embodiments may include the above-described methods being written as one or more software components. These components and the associated functionality may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine-readable software instructions.

Figure 6:
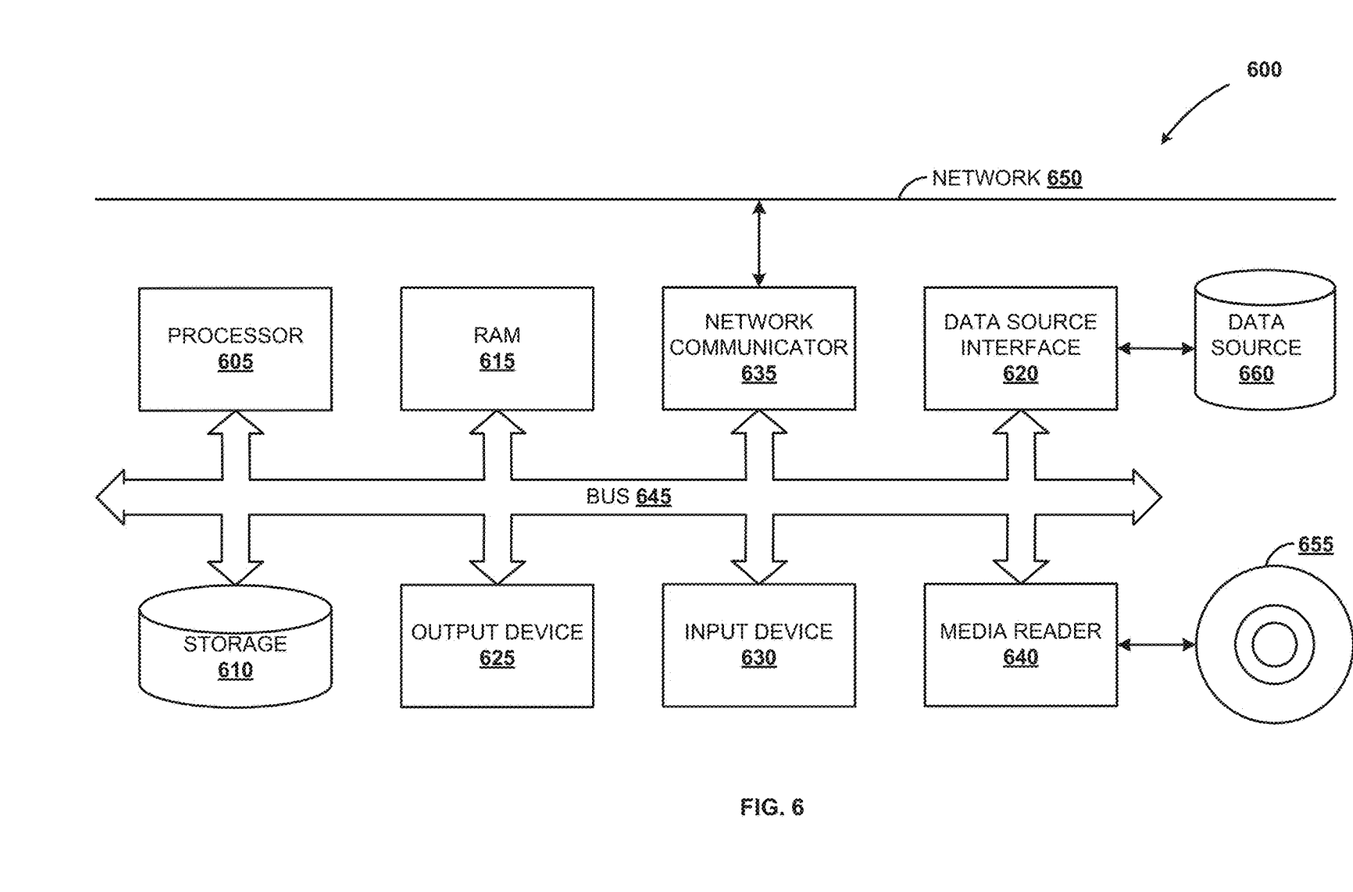
FIG. 6 is a block diagram of a computer system, according to an embodiment.

FIG. 6 is a block diagram of an exemplary computer system 600, according to an embodiment. Computer system 600 includes processor 605 that executes software instructions or code stored on computer readable storage medium 655 to perform the above-illustrated methods. Processor 605 can include a plurality of cores. Computer system 600 includes media reader 640 to read the instructions from computer readable storage medium 655 and store the instructions in storage 610 or in random access memory (RAM) 615. Storage 610 provides a large space for keeping static data where at least some instructions could be stored for later execution. According to some embodiments, such as some in-memory computing system embodiments, RAM 615 can have sufficient storage capacity to store much of the data required for processing in RAM 615 instead of in storage 610. In some embodiments, the data required for processing may be stored in RAM 615. The stored instructions may be further compiled to generate other representations of the instructions and dynamically stored in RAM 615. Processor 605 reads instructions from RAM 615 and performs actions as instructed. According to one embodiment, computer system 600 further includes output device 625 (e.g., a display) to provide at least some of the results of the execution as output including, but not limited to, visual information to users and input device 630 to provide a user or another device with means for entering data and/or otherwise interact with computer system 600. Each of these output devices 625 and input devices 630 could be joined by one or more additional peripherals to further expand the capabilities of computer system 600. Network communicator 635 may be provided to connect computer system 600 to network 650 and in turn to other devices connected to network 650 including other clients, servers, data stores, and interfaces, for instance. The modules of computer system 600 are interconnected via bus 645. Computer system 600 includes a data source interface 620 to access data source 660. Data source 660 can be accessed via one or more abstraction layers implemented in hardware or software. For example, data source 660 may be accessed by network 650. In some embodiments data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system to manage behavior of a graphical user interface for an application, comprising:
   a processor; and
   one or more memory devices communicatively coupled with the processor and storing instructions related to:
   a graphical user interface designer component consuming services located in one or more of the memory devices to design a managed behavior of the graphical user interface;
   a graphical user interface configuration manager to configure a graphical user interface with one or more attributes, the one or more attributes associated with a plurality of applications that at a runtime of the plurality of applications manage the designed behavior of the graphical user interface;
   upon determining an application configuration information, a field metadata manager:
      determining one or more data fields to be mapped onto the graphical user interface; and
      reading metadata information associated with the mapped one or more data fields including one or more data field attributes and one or more domain values, the metadata information including user defined data received from an end user;

upon reading the metadata information, the field metadata manager to retrieve the metadata information associated with the mapped one or more data fields on the graphical user interface, the metadata information associated with the graphical user interface layout information;

the field metadata manager filtering the metadata information by applying a business add-in configured to extract application specific configuration information for one or more of the plurality of applications; and in response to receiving data in the one or more data fields by the graphical user interface, a graphical user interface runtime manager managing the behavior of the graphical user interface and storing the received data in a data format associated with the determined application in a data store.

2. The computer system of claim 1, wherein the data received by the one or more data fields in the graphical user interface is associated with one or more backend integrated data fields, one or more backend independent data fields, and graphical user interface administration data.

3. The computer system of claim 1, wherein the graphical user interface configuration manager is further configured to:
at a design time, store the application configuration information; and
at the runtime, retrieve the stored application configuration information to manage the behavior of the graphical user interface.

4. The computer system of claim 1, further comprising: an authorization manager to authorize a user to configure the one or more attributes associated with the graphical user interface.

5. The computer system of claim 1, wherein the application configuration information is stored in one or more tables including application configuration data.

6. The computer system of claim 1, wherein the metadata information is persisted in a persistency layer in the database.

7. A computer implemented method to manage behavior of a graphical user interface for an application, comprising:
a graphical user interface designer component consuming services located in one or more of the memory devices to design a managed behavior of the graphical user interface;
configuring a graphical user interface with one or more attributes by a graphical user interface configuration manager, the one or more attributes associated with a plurality of applications that at a runtime of the plurality of applications manage the designed behavior of the graphical user interface;
upon determining an application configuration information, a field metadata manager:
determining one or more data fields to be mapped onto the graphical user interface; and
reading metadata information associated with the mapped one or more data fields including one or more data field attributes and one or more domain values, the metadata information including user defined data received from an end user;
upon reading the metadata information, retrieving the metadata information associated with the mapped one or more data fields on the graphical user interface by the field metadata manager, the metadata information associated with the graphical user interface layout information;

the field metadata manager filtering the metadata information by applying a business add-in configured to extract application specific configuration information for one or more of the plurality of applications; and managing the behavior of the graphical user interface by a graphical user interface runtime manager and storing the received data in a data format associated with the determined application in a data store.

8. The computer implemented method of claim 7, wherein the data received by the one or more data fields in the graphical user interface is associated with one or more backend integrated graphical user interface data fields, one or more backend independent graphical user interface data fields, and graphical user interface administration data.

9. The computer implemented method of claim 7, wherein the graphical user interface configuration manager is further configured to:
at a design time, store the application configuration information; and
at the runtime, retrieve the stored application configuration information to manage the behavior of the graphical user interface.

10. The computer implemented method of claim 7, further comprising: an authorization manager to authorize a user to configure the one or more attributes associated with the graphical user interface.

11. The computer implemented method of claim 7, wherein the application configuration information is stored in one or more tables including application configuration data.

12. The computer implemented method of claim 7, wherein the metadata information is persisted in a persistency layer in the database.

13. A non-transitory computer readable storage medium tangibly storing instructions, which when executed by a computer, cause the computer to execute operations, comprising:
a graphical user interface designer component consuming services located in one or more of the memory devices to design a managed behavior of the graphical user interface;
configure a graphical user interface with one or more attributes by a graphical user interface configuration manager, the one or more attributes associated with a plurality of applications that at a runtime of the plurality of applications manage the designed behavior of the graphical user interface;
upon determining an application configuration information, a field metadata manager:
determining one or more data fields to be mapped onto the graphical user interface; and
reading metadata information associated with the mapped one or more data fields including one or more data field attributes and one or more domain values, the metadata information including user defined data received from an end user;
upon reading the metadata information, retrieve the metadata information associated with the mapped one or more data fields on the graphical user interface by the field metadata manager, the metadata information associated with the graphical user interface layout information;
the field metadata manager filtering the metadata information by applying a business add-in configured to extract application specific configuration information for one or more of the plurality of applications; and managing behavior of the graphical user interface by a graphical user interface runtime manager and storing the received data in a data format associated with the determined application in a data store.

14. The non-transitory computer readable storage medium of claim 13, wherein the data received by the one or more data fields in the graphical user interface is associated with one or more backend integrated graphical user interface data fields, one or more backend independent graphical user interface data fields, and graphical user interface administration data.

15. The non-transitory computer readable storage medium of claim 13, wherein the graphical user interface configuration manager is further configured to:

at a design time, store the application configuration information; and at the runtime, retrieve the stored application configuration information to manage the behavior of the graphical user interface.

16. The non-transitory computer readable storage medium of claim 13, further comprising: an authorization manager to authorize a user to configure the one or more attributes associated with the graphical user interface.

17. The non-transitory computer readable storage medium of claim 13, wherein the application configuration information is stored in one or more tables including application configuration data.

18. The non-transitory computer readable storage medium of claim 13, wherein the metadata information is persisted in a persistency layer in the database.

* * * * *